United States Patent
Yura et al.

(10) Patent No.: US 6,191,509 B1
(45) Date of Patent: Feb. 20, 2001

(54) PERMANENT MAGNET TYPE STEPPING MOTOR

(75) Inventors: Tsunao Yura; Akira Koike, both of Tokyo (JP)

(73) Assignee: Sanyo Denki Co., Ltd., Tokyo (JP)

( * ) Notice: Under 35 U.S.C. 154(b), the term of this patent shall be extended for 0 days.

(21) Appl. No.: 09/491,826

(22) Filed: Jan. 26, 2000

(30) Foreign Application Priority Data

Jan. 27, 1999 (JP) .................................................. 11-018792

(51) Int. Cl.[7] .................................................. H02K 37/14
(52) U.S. Cl. .......................................... 310/49 R; 310/254
(58) Field of Search ................................. 310/49 R, 254, 310/162, 164, 257, 193; 29/596–598

(56) References Cited

U.S. PATENT DOCUMENTS

| | | | |
|---|---|---|---|
| 5,291,084 | * | 3/1994 | Shiotsuki et al. .................. 310/49 R |
| 5,962,947 | * | 10/1999 | Suzuki et al. ......................... 310/257 |
| 6,031,305 | * | 2/2000 | Satoh et al. ......................... 310/49 R |

FOREIGN PATENT DOCUMENTS

| | | | |
|---|---|---|---|
| 363031455 | * | 2/1988 | (JP) ..................................... 310/257 |
| 7-245929 | | 9/1995 | (JP) . |
| 7-245930 | | 9/1995 | (JP) . |
| 10-127024 | | 5/1998 | (JP) . |

\* cited by examiner

*Primary Examiner*—Tran N Nguyen
(74) *Attorney, Agent, or Firm*—Pearne & Gordon, LLP (57) ABSTRACT

A permanent magnet type stepping motor capable of exhibiting increased rotational angle accuracy and static angle accuracy. Claw pole type yoke units each include two yokes each provided with n (n: a positive integer of 4 or more) pole teeth. One of the yokes includes n/m pole teeth arranged in each of angular ranges of 360° /m (m: a divisor of n other than 1 and n). Pitches a between pole teeth positioned in each angular range are set to be within a range of (90° /n) [4−m/(n−m)] <a<(360° /n). A pitch b between two pole teeth positioned on both side of a boundary between each adjacent two angular ranges is set to be within a range of (360° /n)<b<(450° /n). The other yoke has pole teeth arranged between the pole teeth of the one yoke.

19 Claims, 9 Drawing Sheets

PERMANENT MAGNET TYPE STEPPING MOTOR

BACKGROUND OF THE INVENTION

This invention relates to a permanent magnet type stepping motor, and more particularly to a permanent magnet type stepping motor adapted to exhibit increased rotational angle accuracy and static angle accuracy.

Figure 8:
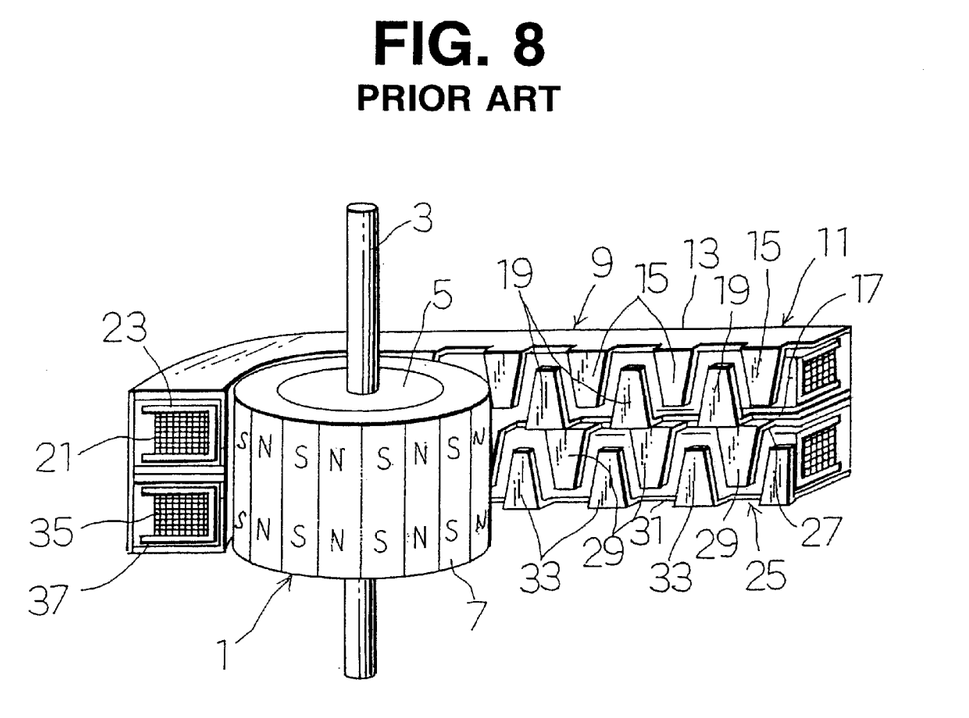
FIG. 8 is a development view showing a conventional two-phase permanent magnet type stepping motor wherein a stator of the stepping motor is developed.
Figure 9:
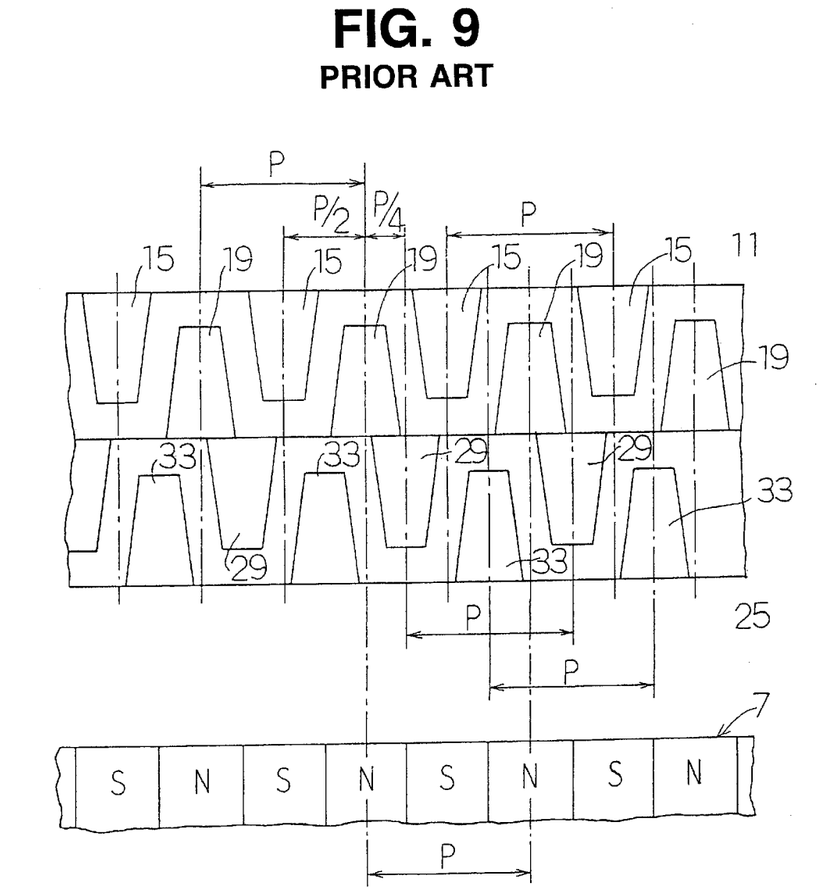
FIG. 9 is a diagrammatic view showing relationship between pole teeth of a stator and magnetic poles of a rotor in the conventional stepping motor shown in FIG. 8.

A typical two-phase permanent magnet type stepping motor which has been conventionally known in the art is constructed in such a manner as shown in FIGS. 8 and 9. In FIG. 8, reference numeral 1 designates a rotor including a cylindrical permanent magnet element 7 securely mounted on a cylindrical bushing 5 fixed on a revolving shaft 3. The revolving shaft 3 is supported by two bearings (not shown). The permanent magnet element 7 is constructed into a cylindrical configuration so as to permit n (n: a positive integer of 4 or more) N magnetic poles and n S magnetic poles to alternately appear at equal pitches thereon in a circumferential direction of the revolving shaft 3. The conventional stepping motor also includes a stator 9 arranged on an outer periphery of the rotor 1 while being mounted in a housing (not shown). The stator 9 includes a first claw pole type yoke unit 11 and a second claw pole type yoke unit 25. The first and second claw pole type yoke units 11 and 25 are juxtaposed to each other in an axial direction of the revolving shaft 3. The first and second claw pole type yoke units 11 and 25 are shifted from each other by a distance one quarter (¼) as large as predetermined pitches P between the magnetic poles of the permanent magnet element 7 in the circumferential direction. The first claw pole type yoke unit 11 includes a first yoke 13 and a second yoke 17 respectively including n pole teeth 15 and 19 arranged opposite to the permanent magnet element 7 at a predetermined interval in a radial direction of the revolving shaft and positioned at predetermined pitches P in the circumferential direction. The first claw pole type yoke unit 11 also includes an exciting winding 21 constructed so as to permit the n pole teeth 15 of the first yoke 13 and the n pole teeth 19 of the second yoke 17 to be excited at polarities different from each other. The exciting winding 21 is wound on a bobbin 23.

The second claw pole yoke unit 25 likewise includes a first yoke 27 and a second yoke 31 respectively including n pole teeth 29 and 33 arranged opposite to the permanent magnet element 7 at a predetermined interval in the radial direction of the revolving shaft and positioned at predetermined pitches P in the circumferential direction. The second claw pole type yoke unit 25 also includes an exciting winding 35 constructed so as to permit the n pole teeth of the first yoke 27 and the n pole teeth 33 of the second yoke 31 to be excited at polarities different from each other. The exciting winding 35 is likewise wound on a bobbin 37.

In the conventional permanent magnet type stepping motor thus constructed, the pitch P between each adjacent two of the pole teeth 15, a pitch P between each adjacent two of the pole teeth 29, a pitch P between each adjacent two of the pole teeth 33 and the above-described pitch P between each adjacent two of the pole teeth of the permanent magnet element 7 are typically set to be identical with each other.

Unfortunately, the conventional permanent magnet type stepping motor thus constructed is deteriorated in rotational angle accuracy and static angle accuracy as compared with a hybrid type stepping motor. In order to eliminate such a problem, a variety of techniques were proposed as disclosed in, for example, Japanese Patent Application Laid-Open Publication No. 245929/1995, Japanese Patent Application Laid-Open Publication No. 245930/1995 and Japanese Patent Application Laid-Open Publication No. 127024/1998. The techniques proposed are generally constructed so as to vary a configuration of pole teeth or shift one of two yokes from the other yoke at a predetermined pitch in a circumferential direction of a revolving shaft, to thereby reduce a detent torque or decrease or remove a specific harmonic component contained in a waveform of induced electromotive force, resulting in eliminating the above-described problem. In the prior art, pitches between pole teeth of each of yokes of claw pole type yoke units are rendered constant.

As described above, those skilled in the art attempted to solve the above-described problem while rendering the pitches between the pole teeth of each of the yokes of the claw pole type yoke units constant. However, this fails to increase rotational angle accuracy and static angle accuracy.

SUMMARY OF THE INVENTION

The present invention has been made in view of the foregoing disadvantage of the prior art.

Accordingly, it is an object of the present invention to provide a permanent magnet type stepping motor which is capable of exhibiting both increased rotational angle accuracy and static angle accuracy.

In accordance with the present invention, a permanent magnet type stepping motor is provided. The permanent magnet type stepping motor includes a rotor having a permanent magnet element fixed on a revolving shaft and a stator including two or more claw pole type yoke units juxtaposed to each other in an axial direction of the revolving shaft. The permanent magnet element is constructed into a cylindrical configuration so as to permit n (n: a positive integer of 4 or more) N magnetic poles and n S magnetic poles to alternately appear at equal pitches thereon in a circumferential direction of the revolving shaft. The claw pole type yoke units each include first and second yokes and an exciting winding. The first and second yokes each include n pole teeth arranged opposite to the permanent magnet element at a predetermined interval in a radial direction of the revolving shaft and positioned at predetermined pitches in the circumferential direction. The exciting winding is constructed so as to permit the n pole teeth of the first yoke and the n pole teeth of the second yoke to be excited at polarities different from each other. The first and second yokes are combined with each other so that the n pole teeth of the first yoke and the n pole teeth of the second yoke are engaged with each other while being kept from being contacted with each other or are alternated with each other while being kept uncontacted with each other.

In the present invention, the n pole teeth of the first yoke of each of the claw pole type yoke units are so arranged that pitches between the n pole teeth of the first yoke adjacent to each other are not set to be constant at 360°/n but set at two or more different pitches which are larger than 270°/n and smaller than 450°/n. It is of course that a total sum of the n pitches between the n pole teeth adjacent to each other is 360°. A basic concept of the present invention is to separate from or abandon a conventional idea that pitches between pole teeth of a yoke of a claw pole type yoke unit is maintained constant. Thus, the present invention is so constructed that pitches between the pole teeth of the first yoke of at least one claw pole type yoke unit are rendered different from each other within the above-described angular conditions. The construction of the prior art that pitches between pole teeth of each of yokes of the claw pole type yoke units are rendered constant causes phases of partial static torques partially occurring between the pitches to be coincident with each other. The prior art attempts to permit a synthesized static torque which is obtained due to synthesis of the partial static torques to approach a sinusoidal wave by varying a configuration of the pole teeth or the like to vary characteristics of the partial static torques. On the contrary, in the present invention, the pitches between the pole teeth of at least the first yoke are rendered nonconstant or varied to shift a phase of each of the partial static torques, to thereby permit characteristics of the synthesized static torque to approach a sinusoidal wave. When it is possible to approach characteristics of the synthesized static torque to a sinusoidal wave, to thereby permit a detent torque to be reduced, resulting in rotational angle accuracy and static angle accuracy being increased as compared with the case that a configuration of each of the pole teeth is rendered constant to keep the pitches between the pole teeth of the yoke unvaried; the n pitches may be varied in any desired pitch pattern. Although a pitch pattern which leads to the best results has not been found yet, the inventors have found that a variation in the pitches within the above-described conditions permits a specific harmonic component to be reduced or removed, leading to an improvement in characteristics of the synthesized static torque as compared with the prior art. The construction of the present invention that the pitches between the n pole teeth adjacent to each other are rendered nonconstant permits a variety of pitch patterns to be employed unless magnetic balance of the stator is highly deteriorated or so long as the magnetic balance is somewhat ensured.

Also, in the present invention, the n pole teeth of the second yoke of each of the claw pole type yoke units may be so arranged that a pitch between each adjacent two of the n pole teeth of the second yoke is set so as to permit the n pole teeth of the first yoke and the n pole teeth of the second yoke to be engaged with each other while being kept from being contacted with each other. For example, the pitches may be constant as in the prior art. However, the pitches of the second yoke may be rendered nonconstant to shift phases of partial static torques occurring between the pitches as in the pitches of the first yoke. Such arrangement exhibits satisfactory advantages as compared with the case that the pitches are constant.

Now, preferred pitch patterns which permit the n pitches between the n pole teeth of the first yoke to be varied will be described by way of example. In a first pitch pattern, the first yoke of the claw pole type yoke unit includes n/m (m: (m: a divisor or factor of n other than 1 and n) pole teeth arranged in each of angular ranges of 360° /m. Also, in the first pitch pattern, in order to reduce the detent torque to increase both rotational angle accuracy and static angle accuracy, a pitch between each adjacent two of the n/m pole teeth positioned in each of the angular ranges is set to be different from a pitch between adjacent two pole teeth positioned on both sides of a boundary between each adjacent two of the angular ranges. In order that the first pitch pattern permits design of the stepping motor and manufacturing thereof to be facilitated, the present invention may be constructed in such a manner that the pitches (a) between the n/m pole teeth positioned in each of the angular ranges each are rendered constant and the pitch (b) between the two pole teeth positioned on both sides of the boundary between each adjacent two of the angular ranges is rendered constant.

Arrangement of the pole teeth employed to vary the pitches between the pole teeth of the first yoke may be carried out in two ways. A first way which is one of the ways is called a short pitch arrangement way or manner. In the short pitch arrangement manner, the n/m pole teeth positioned in each of the angular ranges are arranged at pitches (a) set within a range of (90° /n) [4−m/(n−m)] <a<(360° /n) and the two pole teeth positioned on both sides of the boundary between each adjacent two of the angular ranges are arranged at a pitch (b) set within a range of (360° /n)<b<(450° /n). The short pitch arrangement manner permits the pitch (a) to be smaller than the conventional pitch (360° /n) and the pitch (b) to be larger than that.

A second way which is the other way is called a long pitch arrangement way or manner. In the long pitch arrangement manner, the n/m pole teeth positioned in each of the angular ranges are arranged at pitches (a) set within a range of (90° /n) [4+m/(n−m)] >a>(360° /n) and two such pole teeth positioned on both sides of the boundary between each adjacent two of the angular ranges are arranged at a pitch (b) set within a range of (360° /n)>b>(270° /n). In the long pitch arrangement manner, the pitch (a) is larger than the conventional pitch (360° /n) and the pitch (b) is smaller than that.

The first and second ways described above each permit partial static torques occurring at the pitches to be successively shifted to either a negative side or a positive side within an electrical angle of 90°, resulting in a detent torque or a harmonic component being decreased, leading to an increase in rotational angle accuracy and static angle accuracy.

When a magnetic center is not varied in each of the angular ranges, the pitches (a) in each of the angular ranges may be varied and the pitches (b) of m in number may be varied within the above-described ranges. Nevertheless, in order to facilitate design of the stepping motor, the pitches (a) and (b) are preferably constant. In this instance, values of the pitches (a) and (b) are set so as to meet relationship (n−m)xa+mxb=360°. This not only facilitates design of the stepping motor and manufacturing thereof but permits rotational angle accuracy and static angle accuracy to be increased.

When the pitches of the pole teeth of the first yoke are determined according to the first pitch pattern, the n pole teeth of the second yoke of each of the claw pole type yoke units may be arranged so as to be engaged with the n pole teeth of the first yoke while being kept uncontacted therewith. For example, the first yoke and second yoke which are formed into the same configuration may be combined with each other. In this instance, the second yoke is likewise constructed so as to include n/m such pole teeth arranged in each of the angular ranges of 360° /m (m: a divisor of n other than 1 and n). The pitch between each adjacent two of the n/m pole teeth positioned in each of the angular ranges is set to be different from the pitch between adjacent two pole teeth positioned on both sides of the boundary between each adjacent two of the angular ranges. Also, the pitches (a) between the n/m pole teeth positioned in each of the angular ranges each are rendered constant and the pitch (b) between the adjacent two pole teeth positioned on both sides of the boundary between each adjacent two of the angular ranges is rendered constant. In this instance, the first and second yokes are preferably combined with each other so that the n/m pole teeth positioned in each of the angular ranges of the second yoke each have a center defined at a central position between each adjacent two of the n/m pole teeth positioned in each of the angular ranges of the first yoke.

In order to further improve magnetic balance, the n pole teeth of the second yoke are preferably arranged in such a manner that the pole teeth of the second yoke each have a center defined at a central position between each adjacent two of the n pole teeth of the first yoke. When the m has a value other than n/2 in the case that the pitches (a) and (b) are constant and such conditions are satisfied, the pitch between each adjacent two of the n pole teeth of the second yoke of each of the claw pole type yoke units is so set that a pitch between a pole tooth of which a center is positioned at the boundary and two pole teeth adjacent to the pole tooth is substantially (a+b)/2 and a pitch between the remaining each adjacent two pole teeth is set to be substantially (a). Also, when the m has a value of n/2, the pitch between each adjacent two of the n pole teeth of the second yoke of each of the claw pole type yoke units is set to be substantially (a+b)/2.

In the second pitch pattern for determining the pitches between the n pole teeth of the first yoke, the first yoke includes two or more pole teeth in each of plural angular ranges of which all do not have the same angles and of which a total sum is 360°. The angular ranges each have an angle M (M: a positive integer between 2 and (n−2)) times as large as an angle of 360° /n and have M such pole teeth positioned therein. There is a case that all of the plural angular ranges are different from each other or values of M in the angular ranges are different from each other. Also, there is a case that two or more such angular ranges have the same angle or the values of M in two or more such angular ranges are identical with each other. In such cases, the pitch between each adjacent two of two or more pole teeth positioned in each of the angular ranges is set to be different from the pitch between adjacent two pole teeth positioned on both sides of the boundary between each adjacent two of the angular ranges. In this instance, the pitch (a1, a2 or a3) between each adjacent two of the two or more pole teeth positioned in each of the angular ranges may be rendered constant and the pitch (b) between the adjacent two pole teeth positioned on both sides of the boundary between each adjacent two of the angular ranges may be rendered constant. In employment of the second pitch pattern as well, the n pole teeth of the second yoke are preferably arranged so that the pole teeth of the second yoke each have a center defined at a central position between each adjacent two of the n pole teeth of the first yoke.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, the present invention will be detailedly described hereinafter with reference to FIGS. 1 to 7.

Figure 1:
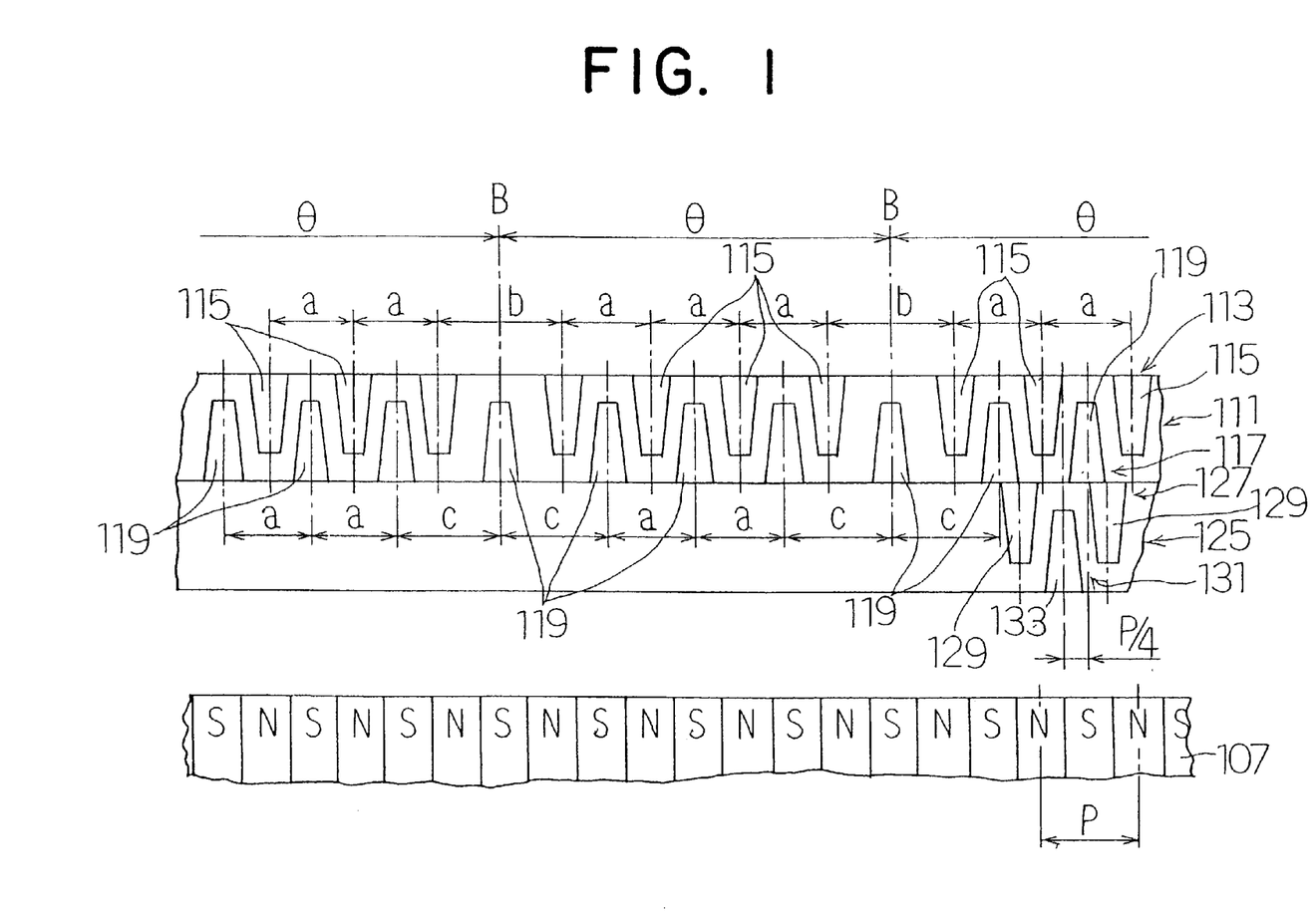
FIG. 1 is a schematic development view showing relationship between pole teeth of two claw pole type yoke units used in an embodiment of a permanent magnet type stepping motor according to the present invention and magnetic poles of a permanent magnet element on a side of a rotor.
Figure 2:
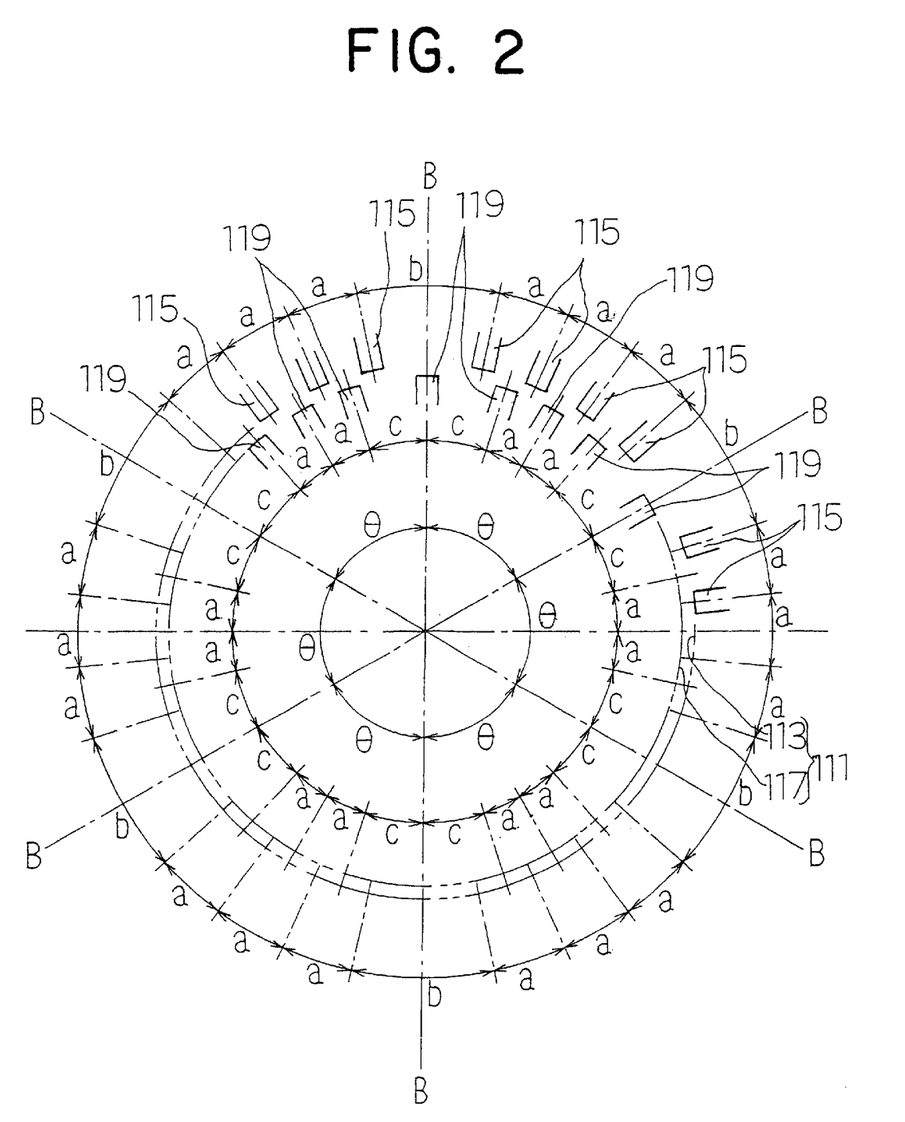
FIG. 2 is a schematic view showing arrangement of pole teeth over an angle of 360° on first and second yokes of each of the claw pole type yoke units in the permanent magnet type stepping motor shown in FIG. 1.

Referring first to FIGS. 1 and 2, an embodiment of a permanent magnet type stepping motor according to the present invention is illustrated. More particularly, FIG. 1 shows relationship between pole teeth 115, 119, 129 and 133 of two claw pole type yoke units 111 and 125 in the permanent magnet type stepping motor of the illustrated embodiment and magnetic poles of a permanent magnet element 107 on a side of a rotor, which relationship is obtained when the embodiment is applied to such a two-phase permanent magnet type stepping motor as shown in FIG. 8. In FIG. 2, arrangement of pole teeth 115 and 119 respectively provided on a first yoke 113 and a second yoke 117 of one of the claw pole type yoke units which is designated at reference numeral 111 is schematically shown over an angle of 360 degrees.

The stepping motor of the illustrated embodiment may be constructed in substantially the same manner as the conventional permanent magnet type stepping motor described above with reference to FIG. 8, except pitches between the pole teeth 115, 119, 129 and 133 of the claw pole type yoke units 111 and 125. In the illustrated embodiment, the permanent magnet element 107 includes forty-eight (48) magnetic poles and correspondingly the first and second yokes 113 and 117 of the claw pole type yoke unit 111 each include twenty-four (24) (=n) pole teeth. The number 24 has divisors of 1, 2, 3, 4, 6, 8, 12 and 24. In the permanent magnet type stepping motor of the illustrated embodiment, the pole teeth 115 of the first yoke 113 are dispersedly arranged so that the pole teeth 115 of n/m in number are present within each of angular ranges θ (=360° /m) obtained by dividing a mechanical angle 360° by divisors m of the number 24 other than 1 and 24. Also, the illustrated embodiment employs a first arrangement manner or a short pitch arrangement manner. In the short pitch arrangement manner, a pitch (a) between each adjacent two of the n/m pole teeth 115 positioned within each angular range θ is set to be within a range determined by the following expression (1):

$$(90°/n)[4-m/(n-m)] < a < (360°/n) \quad (1)$$

Also, a pitch (b) between two pole teeth positioned on both sides of a boundary B between each two of the angular ranges adjacent to each other is set to be within a range determined by the following expression (2):

$$(360°/n) < b < (450°/n) \quad (2)$$

The expression (1) meets conditions that a sum of differences between the pitches (a) between the n/m pole teeth within each of the angular range θ and pitches (360°/n) between the pole teeth which are arranged at equal intervals is within a range one fourth (¼) (an electrical angle of 90 degrees) as large as each pitch (360°/n) between the pole teeth arranged at equal intervals. The expression (2) indicates a range of the pitch (b) which can be taken when the pitch (a) is determined according to the expression (1). The range by the expression (2) is determined on the assumption that relationship (n−m)xa+mxb=360° is established supposing that the pitches (a) and (b) each are constant. The pitches (a) and (b) which meet the above-described expressions have two kinds of values different from each other within a range which is larger than 270°/n and smaller than 450°/n, respectively.

In the illustrated embodiment, in order to obtain better results, pitches between the pole teeth 119 of n in number of the second yoke 117 are so determined that the pole teeth 119 of the second yoke 117 each have a center positioned at a central position between each adjacent two of the pole teeth 115 of n in number of the first yoke 113. More specifically, when m has a value other than n/2, the pitches between the n pole teeth 119 of the second yoke 117 are so determined that pitches between the pole tooth 119 of which a center is positioned at the boundary B and two pole teeth 119 adjacent thereto substantially have a value (c=(a+b)/2) and a pitch between each adjacent two of the remaining pole teeth 119 substantially has a value (a). Also, when m has a value of n/2, the pitches between the pole teeth 119 of n in number of the second yoke 117 is determined so as to be ((a+b)/2).

This results in the pitch (a) being larger than 270°/n and smaller than 360°/n and the pitch (b) being larger than 360°/n and smaller than 450°/n. In FIG. 1, m=6 is selected under the above-described conditions. Thus, the first yoke 113 has six angular ranges θ (=60°) and includes four pole teeth 115 within each of the angular ranges θ. The pitches (a), (b) and (c) between the pole teeth 115 adjacent to each other within each angular range θ are obtained by inserting n=24 and m=6 to the expressions (1) and (2) described above, as follows:

13.75° < a < 15°

15° < b < 18.75°

15° < c < 16.25°

The pitches (a), (b) and (c) selected for actual manufacturing of the stepping motor in the case that m=6 is selected are 14° 18° and 16° by way of example, respectively.

Selection of n=24 and M=12 causes the pitches (a) and (b) of the pole teeth to be alternately appear on the first yoke 113, therefore, only the pitch (c) of the pole teeth appears in the second yoke 117, resulting in arrangement of the pitches at equal intervals being obtained. The object of the present invention is effectively attained in this instance as well.

Figure 3:
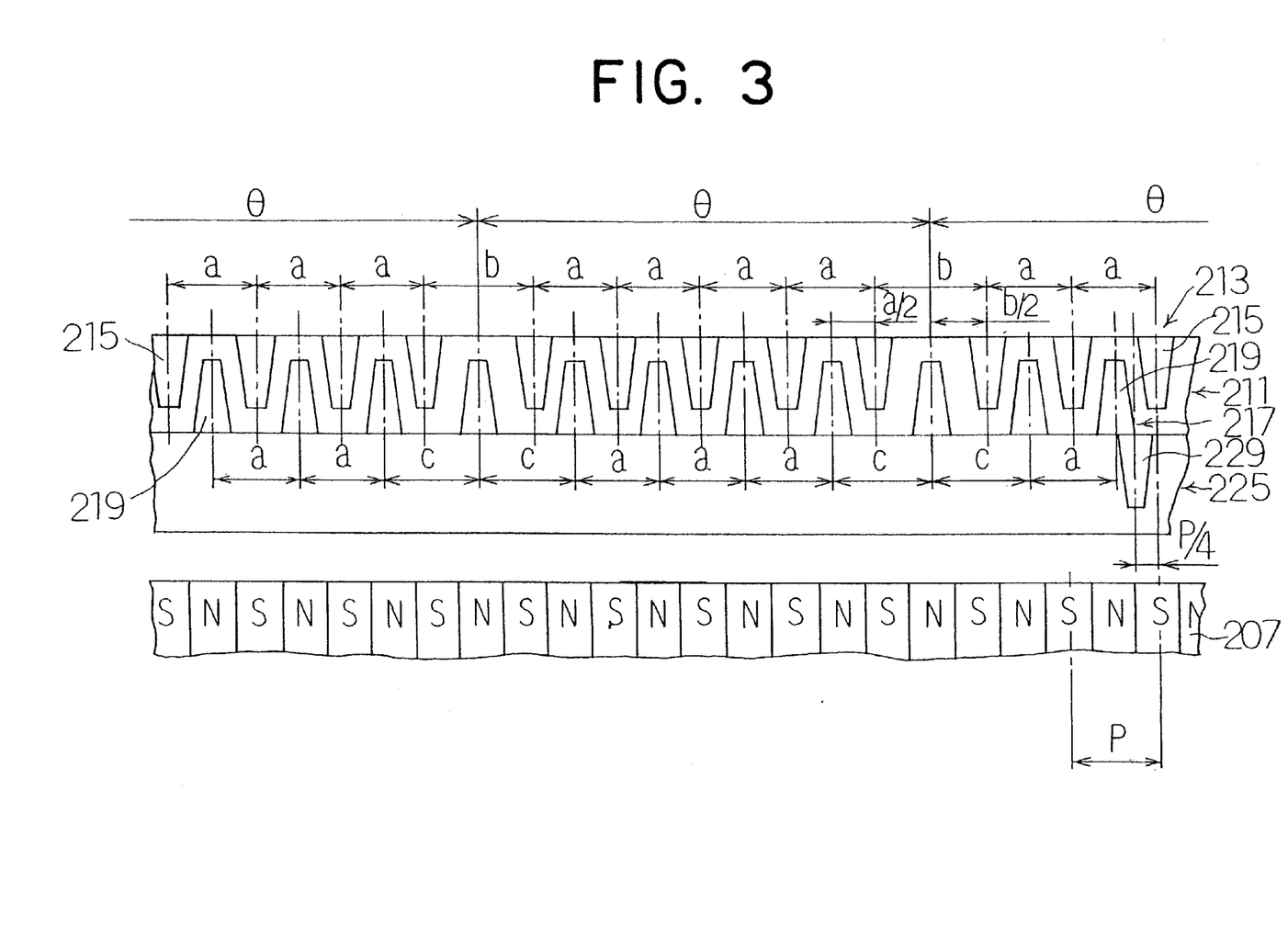
FIG. 3 is a schematic development view showing relationship between pole teeth of two claw pole type yoke units used in another embodiment of a permanent magnet type stepping motor according to the present invention and magnetic poles of a permanent magnet element on a side of a rotor.

Referring now to FIG. 3, another embodiment of a permanent magnet type stepping motor according to the present invention is illustrated. More particularly, FIG. 3 shows relationship between pole teeth 215, 219, 229 and 233 of two claw pole type yoke units 211 and 225 in the permanent magnet type stepping motor of the illustrated embodiment when n=25 and m=5 are given and magnetic poles of a permanent magnet element 207 on a side of a rotor, which relationship is obtained when the embodiment is applied to a two-phase permanent magnet type stepping motor constructed as shown in FIG. 8. In the illustrated embodiment, such relationship of pitches (a), (b) and (c) as described above is established. In this instance, a range of each of (a), (b) and (c) is as follows:

13.5° < a < 14.4°

14.4° < b < 18°

14.4° < c < 15.75°

In this instance, (a), (b) and (c) which permit manufacturing of the stepping motor to be facilitated are 13.68°, 17.28° and 15.48°, respectively.

In each of the embodiment described above, the pole teeth are arranged in a short pitch arrangement manner. Alternatively, the present invention may be applied to the case that the pitches (a) are determined to be larger than pitches (360°/n) for arrangement of the pole teeth at equal intervals. In a long pitch arrangement manner, the pitches (a) between the pole teeth of n/m in number positioned in each angular range are within a range given by the following expression (3):

$$(90°/n)[4+m/(n-m)] > a > (360°/n) \quad (3)$$

The pitch (b) between two pole teeth positioned on both sides of the boundary between each two angular ranges adjacent to each other is within a range given by the following expression (4):

$$(360°/n) > b > (270°/n) \quad (4)$$

In such an arrangement manner, the pitch (a) is rendered larger than the conventional pitch (360°/n) and the pitch (b) is rendered smaller than the pitch (360°/n). The expression (3) meets conditions that a sum of differences between the pitch (a) between the pole teeth of n/m in number within each angular range θ and the pitches (360°/n) between the pole teeth arranged at equal intervals is within a range one fourth (¼) (an electrical angle of 90 degrees) as large as each of the pitches (360°/n) between the pole teeth arranged at equal intervals. The expression (4) indicates a range of the pitch (b) which can be taken when the pitch (a) is determined according to the expression (1). The range by the expression (4) is determined on the assumption that relationship of (n−m)xa+mxb=360° is established supposing that the pitches (a) and (b) each are constant.

Figure 4:
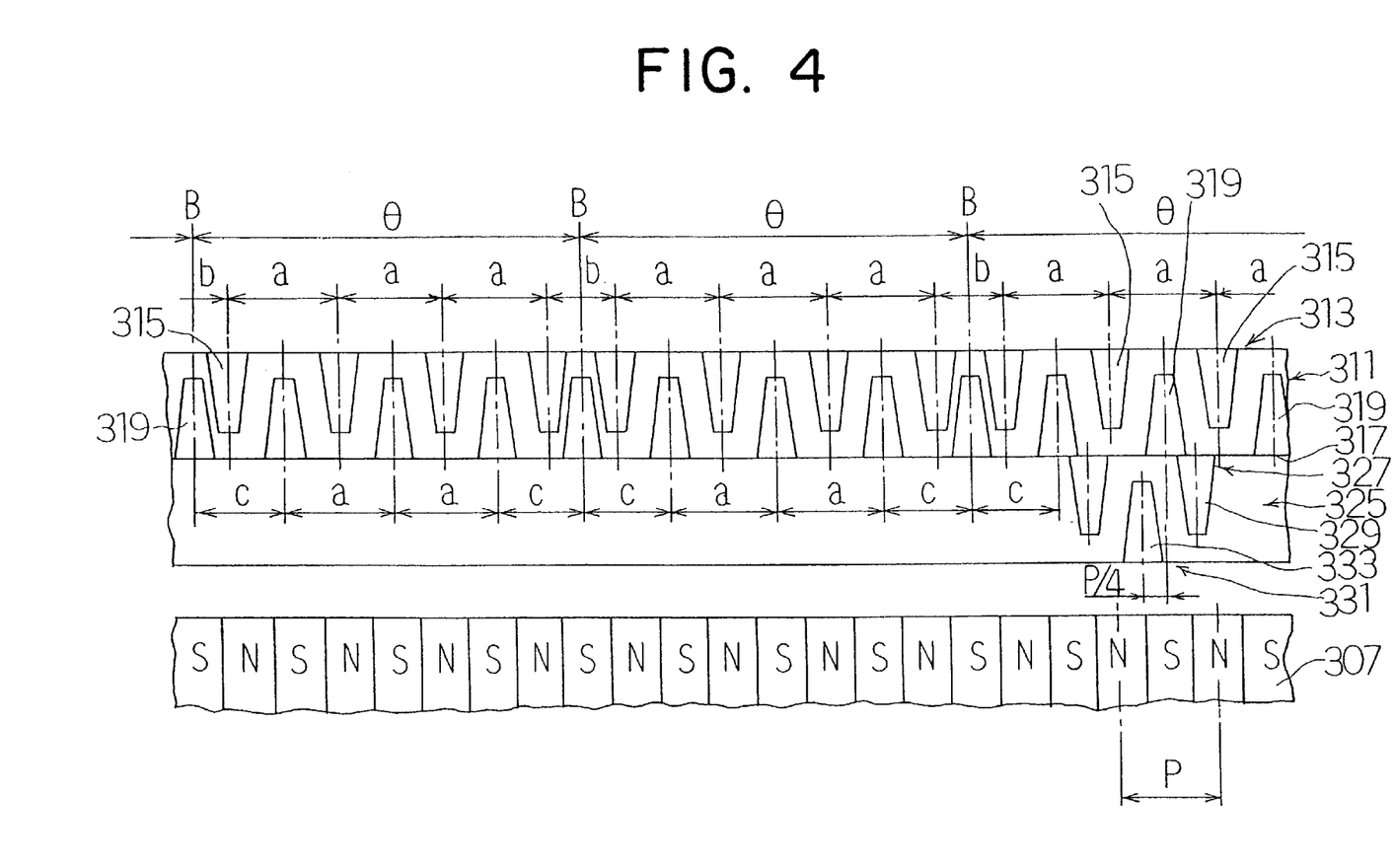
FIG. 4 is a schematic development view showing relationship between pole teeth of two claw pole type yoke units used in a further embodiment of a permanent magnet type stepping motor according to the present invention and magnetic poles of a permanent magnet element on a side of a rotor.

Referring now to FIG. 4, a further embodiment of a permanent magnet type stepping motor according to the present invention is illustrated. More particularly, FIG. 4 shows relationship between pole teeth 315, 319, 329 and 333 of two claw pole type yoke units 311 and 325 in the permanent magnet type stepping motor of the illustrated embodiment when n=24 and m=6 are given and magnetic poles of a permanent magnet element 307 on a side of a rotor, which relationship is obtained when the embodiment is applied to the two-phase permanent magnet type stepping motor shown in FIG. 8. In the illustrated embodiment, such relationship among pitches (a), (b) and (c) as determined by the expressions (3) and (4) described above is established. In this instance, a range of each of the pitches (a), (b) and (c) is as follows:

16.25° <a<15°
15° <b<11.25°
15° <c<13.75°

In this instance, the pitches (a), (b) and (c) which permit manufacturing of the stepping motor to be facilitated are 16°, 12° and 14°, respectively.

Figure 5:
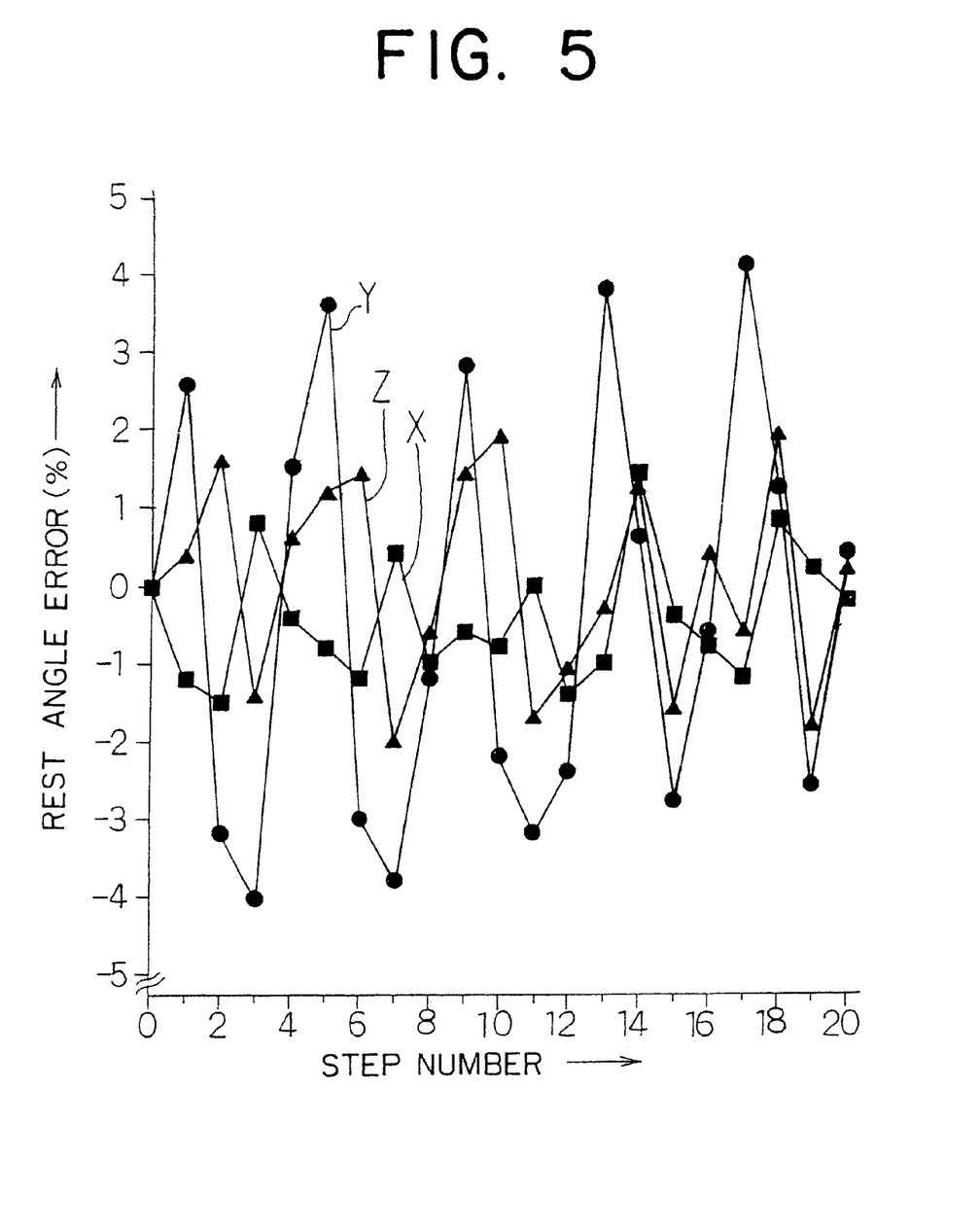
FIG. 5 is a graphical representation showing comparison between a static angle error in the present invention and that in a prior art.
Figure 10:
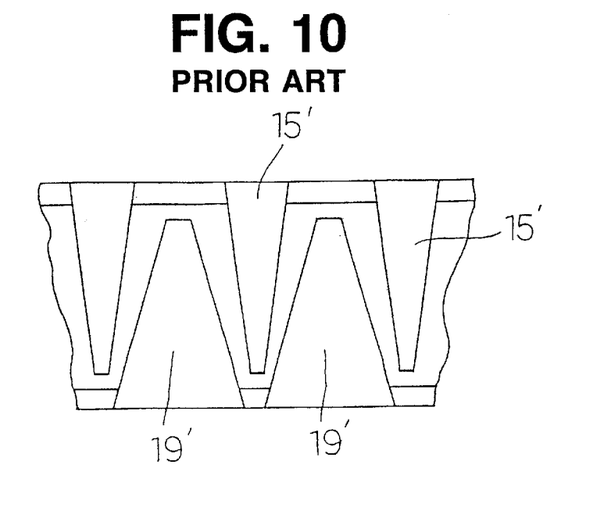
FIG. 10 is a fragmentary view showing pole teeth of a claw pole type yoke unit in a conventional stepping motor.

FIG. 5 shows a static angle error (X) of the stepping motor of FIG. 1, a static angle error (Y) of the conventional stepping motor (n=24) shown in FIGS. 8 and 9, and a static angle error (Z) of a conventional stepping motor shown in FIG. 10 wherein pole teeth 15' and 19' are arranged at constant pitches, to thereby reduce a width of the pole teeth 15' of one yoke as shown in FIG. 10 (see FIG. 3 of Japanese Patent Application Laid-Open Publication No. 127024/1998), while comparing them with each other. As will be noted from FIG. 5, the stepping motor of the present invention is considerably reduced in static angle error as compared with the conventional stepping motors. More specifically, the stepping motor shown in FIG. 1 has a static angle error reduced to a level as low as about ±1.5% or less.

In each of the embodiments described above, the first and second yokes are formed into configurations different from each other. Alternatively, both yokes may be formed into the same configuration.

Figure 6:
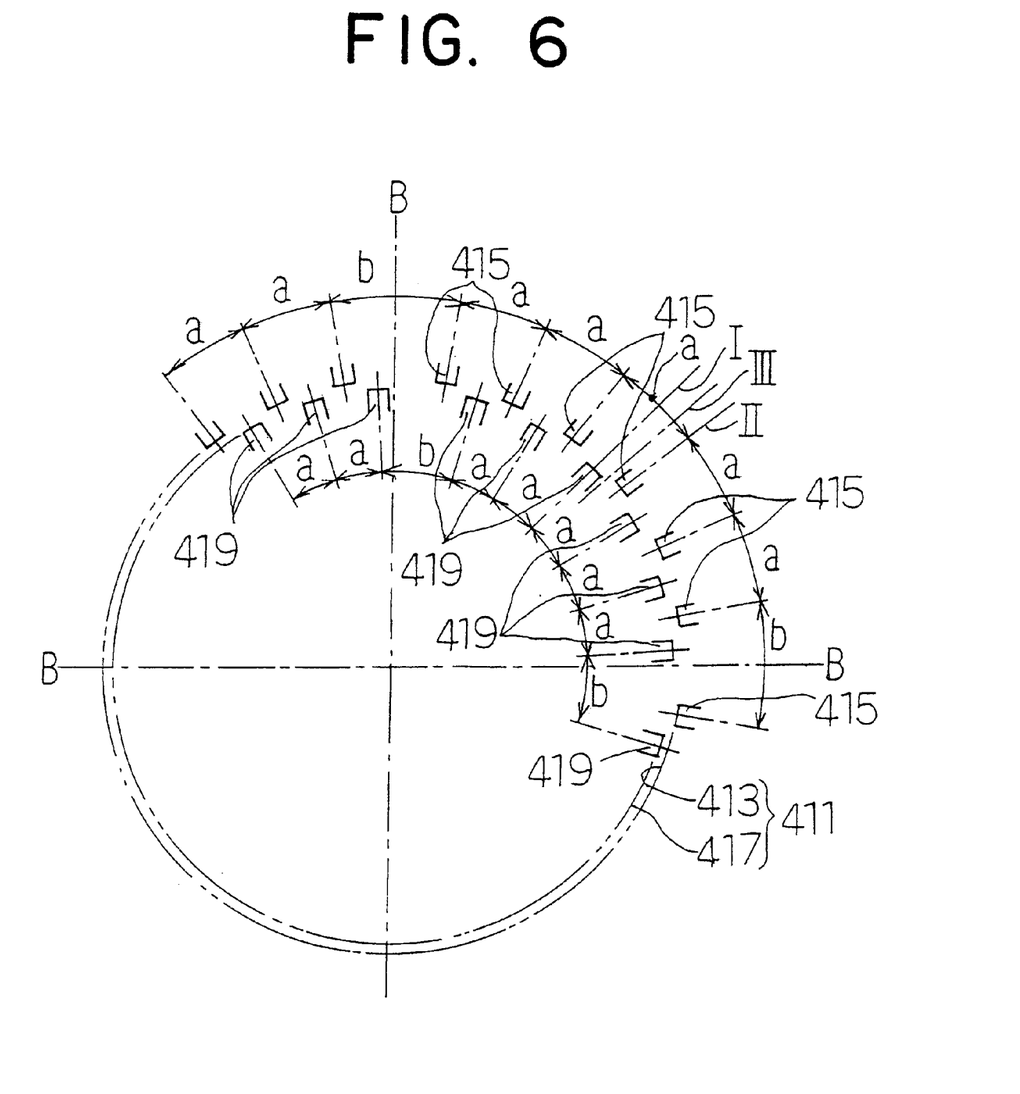
FIG. 6 is a schematic view showing arrangement of pole teeth over an angle of 360° on first and second yokes of each of claw pole type yoke units in still another embodiment of a permanent magnet type stepping motor according to the present invention wherein a first yoke and a second yoke are formed into the same configuration.

Referring now to FIG. 6, still another embodiment of a permanent magnet type stepping motor according to the present invention is illustrated. More particularly, FIG. 6 shows arrangement (pitch pattern) of pole teeth of one claw pole type yoke unit 411 wherein a first yoke 413 and a second yoke 413 are formed into the same configuration. In the illustrated embodiment, the first yoke 413 and second yoke 417 include twenty-four (24) pole teeth 415 and twenty-four (24) pole teeth 419, respectively, wherein each six pole teeth are arranged in each of four angular ranges of 90°. The illustrated embodiment is so constructed that a pitch (a) between each adjacent two of the respective six pole teeth 415 is rendered constant and a pitch (b) between two pole teeth positioned on both sides of a boundary between each adjacent two of the angular ranges is rendered constant, resulting in a short pitch arrangement manner which has relationship a<b being established as in the embodiment described above with reference to FIG. 1. Also, in the illustrated embodiment, the first and second yokes 413 and 417 are combined with each other so that six pole teeth 419 arranged in each of the angular ranges of the second yoke 417 each have a center positioned at a central position of each of six pole teeth 415 arranged in each corresponding angular range of the first yoke 413. In FIG. 6, reference character I designates a magnetic center of the first yoke 413, II is a magnetic center of the second yoke 417, and III is a synthesized magnetic center of the first and second yokes 413 and 417. Such arrangement likewise improves static torque characteristics of the stepping motor as compared with the prior art.

The embodiments described above each employ a pitch pattern wherein the plural angular ranges at which the plural pole teeth of the first yoke are divided into groups each have the same angle. However, the present invention is not limited to such arrangement of the angular ranges.

Figure 7:
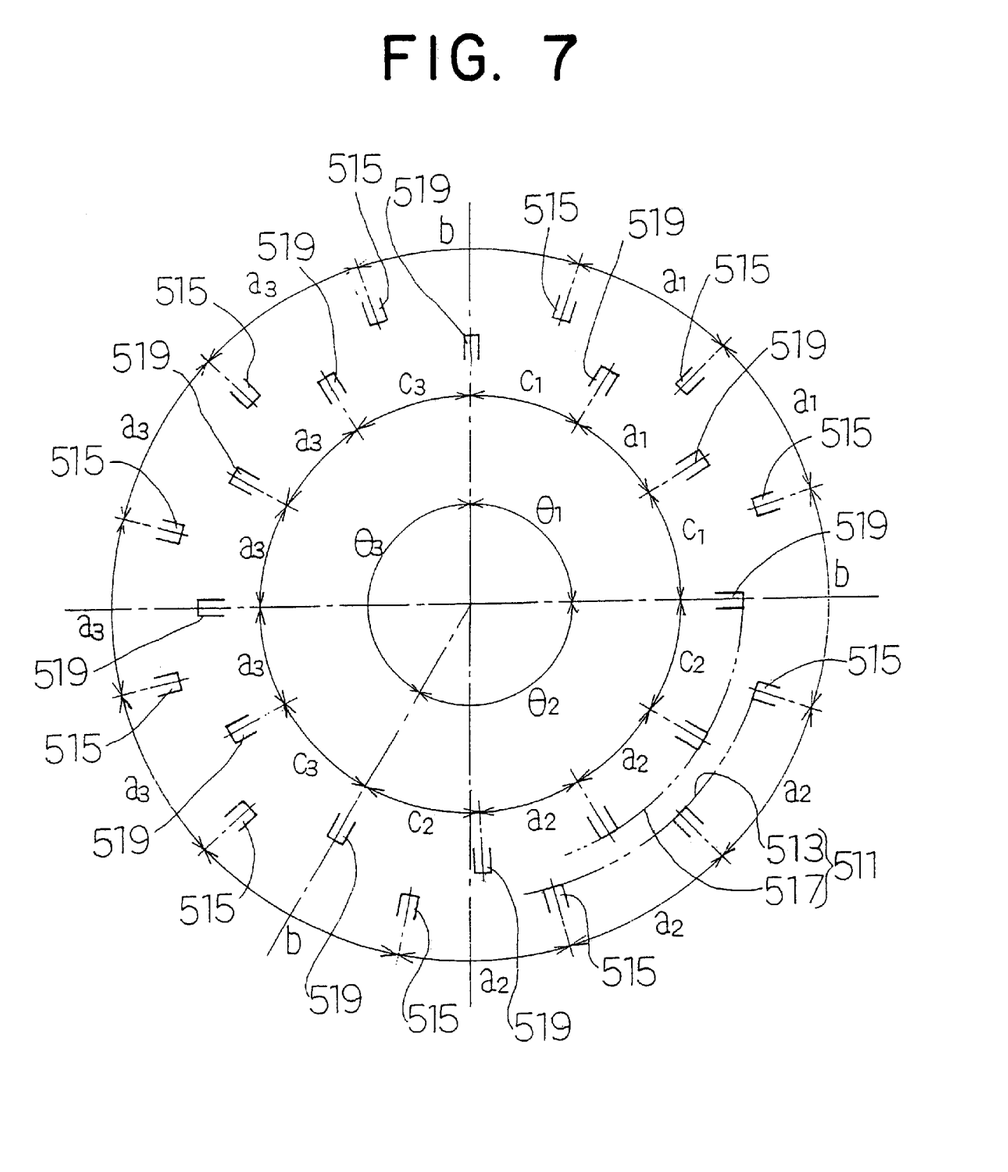
FIG. 7 is a schematic view showing arrangement of pole teeth over an angle of 360° on first and second yokes of each of claw pole type yoke units in a still further embodiment of a permanent magnet type stepping motor according to the present invention.

Referring now to FIG. 7, yet another embodiment of a permanent magnet type stepping motor according to the present invention is illustrated. A permanent magnet type stepping motor of the illustrated embodiment employs a short pitch arrangement manner wherein pole teeth 515 of a first yoke 513 are arranged at a pitch pattern which permits a plurality of angular ranges θ1 to θ3 at which a plurality of pole teeth 515 of a first yoke 513 are divided into groups to be set to be different from each other. In the illustrated embodiment, twelve such pole teeth 515 are arranged (n=12). Also, in the illustrated embodiment, the plural angular ranges and more particularly three such angular ranges θ1 to θ3 of which a total sum is 360 degrees are set to be different from each other. The angular ranges θ1 to θ3 each include two or more pole teeth. Three such angular ranges θ1 to θ3 each have an angle M times as large as 360°/n, wherein M is selected from positive integers between 2 and (n−2). The angular ranges each include pole teeth of M in number. More specifically, the angular range θ1 is three times as large as 360°/12 or has an angle of 90° and three such pole teeth 515 are arranged within the angular range θ1. A pitch (a1) between each two of the pole teeth 515 is rendered constant. The pitch (a1) is a short pitch, resulting in being selected from a range of 26.25° <a1<30°. The angular range θ2 has an angle four times as large as 360°/12 or an angle of 120°, within which four such pole teeth 515 are arranged. A pitch (a2) between each two of the four pole teeth 515 is rendered constant and constitutes a short pitch, resulting in being selected from a range of 27.25° <a2<30°. The angular range θ3 has an angle five times as large as 360°/12 or an angle of 150°, within which five such pole teeth 515 are arranged. A pitch (a3) between each two of the five pole teeth 515 is rendered constant and constitutes a short pitch, resulting in being selected from a range of 27.125° <a3<30 . In the illustrated embodiment, a pitch (b) between two pole teeth 515 positioned on both sides of a boundary B between each two of the angular ranges is set to be constant. The pitch (b) is selected from a range of 30° <b<37.5°.

On the contrary, in a second yoke 517, twelve pole teeth 519 are arranged at pitches which are so set that a center of each of the pole teeth 519 of the second yoke 517 is defined at a central position between each adjacent two of the twelve pole teeth 515 of the first yoke 513. Such arrangement results in pitches between the respective adjacent two of the twelve pole teeth 519 including six kinds of pitches (a1), (a2), (a3), (c1), (c2) and (c3) as shown in FIG. 7. The pitches (a1), (a2) and (a3) are set as described above. The pitches (c1), (c2) and (c3) are set to be within ranges of 30° <c1<31.875°, 30°<c2<32.5° and 30°<c3<32.8125°, respectively. In the illustrated embodiment, the pitches which facilitate design of the stepping motor are (a1)=27°, (a2)=28°, (a3)=28.5°, (b)=36°, (c1)=31.5°, (c2)=32° and (c3)=32.5° by way of example.

In the embodiment shown in FIG. 7, the plural angular ranges θ1 to θ3 are set to be different from each other. Alternatively, when the angular ranges are 3 or more in number, two or more such angular ranges may have the same degrees. Also, in the illustrated embodiment, the pitches (a1) to (a3) among two or more pole teeth positioned within each angular range are rendered constant and the pitch (b) between two pole teeth positioned on both sides of the boundary between each two of the angular ranges adjacent to each other is rendered constant. Alternatively, the pitches may be different from each other within the conditions described above.

The embodiments described above each are directed to application of the present invention to the two-phase permanent magnet type stepping motor, however, the present invention may be effectively applied to a Q-phase (Q: a positive integer of 3 or more) permanent magnet type stepping motor wherein claw pole type yoke units of 3 or more in number are arranged in an axial direction thereof. The Q-phase permanent magnet type stepping motor is so constructed that the claw pole type yoke units of Q in number are arranged while being shifted in a circumferential direction thereof by a pitch of 1/(2Q) as large as a pitch between the magnetic poles.

As can be seen from the foregoing, in the present invention, a variation in pitch between the pole teeth of at least the first yoke permits phases of partial static torques occurring between the pitches to be shifted from each other, resulting in a synthesized static torque having characteristics which approach a sinusoidal wave being obtained. Thus, the present invention permits characteristics of the synthesized static torque to approach a sinusoidal wave as compared with the prior art, to thereby provide a permanent magnet type stepping motor increased in both rotational angle accuracy and static angle accuracy as compared with the prior art.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A permanent magnet type stepping motor comprising:
   a rotor having a permanent magnet element fixed on a revolving shaft;
   said permanent magnet element being constructed into a cylindrical configuration so as to permit n (n: a positive integer of 4 or more) north (N) magnetic poles and n south (S) magnetic poles to alternately appear at equal pitches thereon in a circumferential direction of said revolving shaft; and
   a stator including two or more claw pole type yoke units juxtaposed to each other in an axial direction of said revolving shaft;
   said claw pole type yoke units each including first and second yokes and an exciting winding;
   said first and second yokes each including n pole teeth arranged opposite to said permanent magnet element at a predetermined interval in a radial direction of said revolving shaft and positioned at predetermined pitches in said circumferential direction;
   said exciting winding being constructed so as to permit said n pole teeth of said first yoke and said n pole teeth of said second yoke to be excited at polarities different from each other;
   said first and second yokes being combined with each other so that said n pole teeth of said first yoke and said n pole teeth of said second yoke are engaged with each other while being kept from being contacted with each other;
   said n pole teeth of said first yoke of each of said claw pole type yoke units being so arranged that mechanical pitches between respective adjacent two of said n pole teeth of said first yoke are not set to be constant at 360° /n but set at two or more different pitches which are larger than 270° /n and smaller than 450° /n;
   said n pole teeth of said second yoke of each of said claw pole type yoke units being so arranged that a pitch between each adjacent two of said n pole teeth of said second yoke is set so as to permit said n pole teeth of said first yoke and said n pole teeth of said second yoke to be engaged with each other while being kept from being contacted with each other.

2. A permanent magnet type stepping motor as defined in claim 1, wherein said first yoke includes said pole teeth of n/m (m: a divisor of n other than 1 and n) in number arranged in each of angular ranges of 360° /m; and
   a pitch between each adjacent two of said n/m pole teeth positioned in each of said angular ranges is set to be different from a pitch between adjacent two pole teeth positioned on both sides of a boundary between each adjacent two of said angular ranges.

3. A permanent magnet type stepping motor as defined in claim 2, wherein said pitches between said n/m pole teeth positioned in each of said angular ranges each are rendered constant; and
   said pitch between said adjacent two pole teeth positioned on both sides of said boundary is rendered constant.

4. A permanent magnet type stepping motor as defined in claim 1 or 3, wherein said pitch between each adjacent two of said n pole teeth of said second yoke of each of said claw pole type yoke units is so set that each of said pole teeth of said second yoke has a center defined at a central position between each adjacent two of said n pole teeth of said first yoke.

5. A permanent magnet type stepping motor as defined in claim 3, wherein said second yoke includes said n/m pole teeth arranged in each of angular ranges of 360 /m;
   said pitch between each adjacent two of said n/m pole teeth positioned in each of said angular ranges is set to be different from said pitch between adjacent two pole teeth positioned on both sides of said boundary between each adjacent two of said angular ranges;
   said pitches between said n/m pole teeth positioned in each of said angular ranges each are rendered constant; and
   said pitch between said adjacent two pole teeth positioned on both sides of said boundary between each adjacent two of said angular ranges is rendered constant.

6. A permanent magnet type stepping motor as defined in claim 5, wherein said n/m pole teeth positioned in each of said angular ranges of said second yoke each have a center defined at a central position between each adjacent two of said n/m pole teeth positioned in each of said angular ranges of said first yoke.

7. A permanent magnet type stepping motor as defined in claim 1, wherein said first yoke includes two or more pole teeth in each of plural angular ranges of which all do not have the same angles and of which a total sum is 360°;
   said angular ranges each have an angle M (M: a positive integer between 2 and (n−2)) times as large as an angle of 360° /n and have said pole teeth of M in number positioned therein; and
   a pitch between each adjacent two of said two or more pole teeth positioned in each of said angular ranges is set to be different from a pitch between adjacent two pole teeth positioned on both sides of a boundary between each adjacent two of said angular ranges.

8. A permanent magnet type stepping motor as defined in claim 7, wherein said pitch between each adjacent two of said two or more pole teeth positioned in each of said angular ranges is rendered constant; and
   said pitch between said adjacent two pole teeth positioned on both sides of said boundary between each adjacent two of said angular ranges is rendered constant.

9. A permanent magnet type stepping motor as defined in claim 7 or 8, wherein said n pole teeth of said second yoke are so arranged that said pole teeth of said second yoke each have a center defined at a central position between each adjacent two of said n pole teeth of said first yoke.

10. A permanent magnet type stepping motor comprising:

a rotor having a permanent magnet element fixed on a revolving shaft;

said permanent magnet element being constructed into a cylindrical configuration so as to permit n (n: a positive integer of 4 or more) north (N) magnetic poles and n south (S) magnetic poles to alternately appear at equal pitches thereon in a circumferential direction of said revolving shaft; and a stator including two or more claw pole type yoke units juxtaposed to each other in an axial direction of said revolving shaft;

said claw pole type yoke units each including first and second yokes and an exciting winding;

said first and second yokes each including n pole teeth arranged opposite to said permanent magnet element at a predetermined interval in a radial direction of said revolving shaft and positioned at predetermined pitches in said circumferential direction;

said exciting winding being constructed so as to permit said n pole teeth of said first yoke and said n pole teeth of said second yoke to be excited at polarities different from each other;

said first and second yokes being combined with each other so that said n pole teeth of said first yoke and said n pole teeth of said second yoke are engaged with each other while being kept from being contacted with each other;

said first yoke of each of said claw pole type yoke units including said pole teeth of n/m (m: a divisor of n other than 1 and n) in number in each of angular ranges of 360°/m;

said n/m pole teeth positioned in each of said angular ranges being arranged at mechanical pitches (a) set to be within a range of (90°/n) [4−m/(n−m)] <a<(360°/n);

two said pole teeth positioned on both sides of a boundary between each adjacent two of said angular ranges being arranged at a mechanical pitch (b) set to be within a range of (360°/n)<b<(450°/n).

11. A permanent magnet type stepping motor as defined in claim 10, wherein said pitches (a) and (b) each are rendered constant and so determined that relationship (n−m)xa+mxb= 360° may be established.

12. A permanent magnet type stepping motor as defined in claim 10 or 11, wherein said pitch between each adjacent two of said n pole teeth of said second yoke of each of said claw pole type yoke units is so set that each of said pole teeth of said second yoke has a center defined at a central position between each adjacent two of said n pole teeth of said first yoke.

13. A permanent magnet type stepping motor as defined in claim 10, wherein said m has a value other than n/2; and said pitch between each adjacent two of said n pole teeth of said second yoke of each of said claw pole type yoke units is so set that a pitch between said pole tooth of which said center is positioned at said boundary and two pole teeth adjacent to said pole tooth is substantially (a+b)/2 and a pitch between the remaining adjacent two pole teeth is substantially (a).

14. A permanent magnet type stepping motor as defined in claim 10, wherein said m has a value of n/2; and said pitch between each adjacent two of said n pole teeth of said second yoke of each of said claw pole type yoke units is set to be substantially (a+b)/2.

15. A permanent magnet type stepping motor comprising:

a rotor having a permanent magnet element fixed on a revolving shaft;

said permanent magnet element being constructed into a cylindrical configuration so as to permit n (n: a positive integer of 4 or more) north (N) magnetic poles and n south (S) magnetic poles to alternately appear at equal pitches thereon in a circumferential direction of said revolving shaft; and a stator including two or more claw pole type yoke units juxtaposed to each other in an axial direction of said revolving shaft;

said claw pole type yoke units each including first and second yokes and an exciting winding;

said first and second yokes each including n pole teeth arranged opposite to said permanent magnet element at a predetermined interval in a radial direction of said revolving shaft and positioned at predetermined pitches in said circumferential direction;

said exciting winding being constructed so as to permit said n pole teeth of said first yoke and said n pole teeth of said second yoke to be excited at polarities different from each other;

said first and second yokes being combined with each other so that said n pole teeth of said first yoke and said n pole teeth of said second yoke are engaged with each other while being kept from being contacted with each other;

said first yoke of each of said claw pole type yoke units including said pole teeth of n/m (m: a divisor of n other than 1 and n) in number in each of angular ranges of 360°/m;

said n/m pole teeth positioned in each of said angular ranges being arranged at mechanical pitches (a) set to be within a range of (90°/n) [4+m/(n−m)] >a>(360°/n);

two said pole teeth positioned on both sides of a boundary between each adjacent two of said angular ranges being arranged at a mechanical pitch (b) set to be within a range of (360°/n)>b>(270°/n).

16. A permanent magnet type stepping motor as defined in claim 15, wherein said pitches (a) and (b) each are rendered constant and so determined that relationship (n−m)xa+mxb= 360 may be established.

17. A permanent magnet type stepping motor as defined in claim 15 or 16, wherein said pitch between each adjacent two of said n pole teeth of said second yoke of each of said claw pole type yoke units is so set that each of said pole teeth of said second yoke has a center defined at a central position between each adjacent two of said n pole teeth of said first yoke.

18. A permanent magnet type stepping motor as defined in claim 15, wherein said m has a value other than n/2; and said pitch between each adjacent two of said n pole teeth of said second yoke of each of said claw pole type yoke units is so set that a pitch between said pole tooth of which said center is positioned at said boundary and two pole teeth adjacent to said pole tooth is substantially (a+b)/2 and a pitch between the remaining adjacent two pole teeth is substantially (a).

19. A permanent magnet type stepping motor as defined in claim 15, wherein said m has a value of n/2; and said pitch between each adjacent two of said n pole teeth of said second yoke of each of said claw pole type yoke units is set to be substantially (a+b)/2.

* * * * *

UNITED STATES PATENT AND TRADEMARK OFFICE
CERTIFICATE OF CORRECTION

PATENT NO.    : 6,191,509 B1
DATED         : February 20, 2001
INVENTOR(S)   : Tsunao Yura and Akira Koike Page 1 of 1

It is certified that error appears in the above-identified patent and that said Letters Patent is hereby corrected as shown below:

Column 10,
Line 29, delete "<a3<30" and insert -- <a3<30° --.

Column 14,
Line 44, delete "360" and insert -- 360° --.

Signed and Sealed this

Seventh Day of August, 2001

Attest:

NICHOLAS P. GODICI
Attesting Officer    Acting Director of the United States Patent and Trademark Office